(12) United States Patent
Takeuchi

(10) Patent No.: US 11,573,316 B2
(45) Date of Patent: Feb. 7, 2023

(54) ELECTROMAGNETIC WAVE DETECTION APPARATUS AND INFORMATION ACQUISITION SYSTEM

(71) Applicant: KYOCERA Corporation, Kyoto (JP)

(72) Inventor: Eri Takeuchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 268 days.

(21) Appl. No.: 16/959,106

(22) PCT Filed: Jan. 16, 2019

(86) PCT No.: PCT/JP2019/001035
§ 371 (c)(1),
(2) Date: Jun. 29, 2020

(87) PCT Pub. No.: WO2019/146461
PCT Pub. Date: Aug. 1, 2019

(65) Prior Publication Data
US 2020/0333458 A1     Oct. 22, 2020

(30) Foreign Application Priority Data
Jan. 26, 2018   (JP) .............................. JP2018-011881

(51) Int. Cl.
*G01S 13/89*     (2006.01)
*G01J 5/10*      (2006.01)
(Continued)

(52) U.S. Cl.
CPC ................ *G01S 13/89* (2013.01); *G01J 5/10* (2013.01); *G01S 7/4816* (2013.01);
(Continued)

(58) Field of Classification Search
CPC ........ G01S 7/4817; G01S 13/89; G01S 17/89; G01J 5/10; G01J 2005/0077; G02B 26/0816; G02B 26/101
See application file for complete search history.

(56) References Cited

U.S. PATENT DOCUMENTS

2005/0224695 A1* 10/2005 Mushika ................ G02B 26/06
                                                         250/208.2
2011/0211077 A1   9/2011 Nayar et al.
2015/0312554 A1  10/2015 Banks et al.

FOREIGN PATENT DOCUMENTS

DE    102005049471 A1   5/2007
EP       1 102 104 A2   5/2001
(Continued)

*Primary Examiner* — Kevin K Pyo
(74) *Attorney, Agent, or Firm* — Studebaker & Brackett PC

(57) ABSTRACT

An electromagnetic wave detection apparatus comprises a first image formation unit, a travel unit 18, a second image formation unit, and a first detector. The travel unit 18 includes a plurality of pixels px arranged along a reference surface. The electromagnetic wave detection apparatus has at least one of: an arrangement in which respective extension surfaces of the reference surface and a detection surface of the first detector intersect each other and a main axis of the second image formation unit intersects the reference surface and the detection surface of the first detector; and an arrangement in which respective extension surfaces of the reference surface and an object surface of the first image formation unit whose spacing to the travel unit is set and whose image surface is the reference surface intersect each other and a main axis of the first image formation unit intersects the reference surface.

12 Claims, 6 Drawing Sheets

(51) Int. Cl.
*G01S 7/481* (2006.01)
*G01S 17/89* (2020.01)
*G02B 26/08* (2006.01)
*G02B 26/10* (2006.01)
*G01J 5/00* (2022.01)

(52) U.S. Cl.
CPC ............ *G01S 7/4817* (2013.01); *G01S 17/89* (2013.01); *G02B 26/0816* (2013.01); *G02B 26/101* (2013.01); *G01J 2005/0077* (2013.01)

(56) References Cited

FOREIGN PATENT DOCUMENTS

| | | |
|---|---|---|
| JP | H11-508359 A | 7/1999 |
| JP | 2001-201699 A | 7/2001 |
| JP | 3507865 B2 | 3/2004 |
| JP | 2013-145145 A | 7/2013 |
| WO | 2004/077819 A1 | 9/2004 |
| WO | 2009/133849 A1 | 11/2009 |

\* cited by examiner

ELECTROMAGNETIC WAVE DETECTION APPARATUS AND INFORMATION ACQUISITION SYSTEM

CROSS REFERENCE TO RELATED APPLICATION

This application claims priority to and the benefit of Japanese Patent Application No. 2018-11881 filed on Jan. 26, 2018, the entire disclosure of which is incorporated herein by reference.

TECHNICAL FIELD

The present disclosure relates to an electromagnetic wave detection apparatus and an information acquisition system.

BACKGROUND

Apparatuses including elements for switching the traveling direction of incident electromagnetic waves for each pixel, such as a DMD, are known. For example, an apparatus that performs primary formation of an image of an object on a DMD surface and further performs, on a CCD surface through a lens, secondary formation of the image formed on the DMD surface by the primary formation is known (see PTL 1).

CITATION LIST

Patent Literature

PTL 1: JP 3507865 B2

SUMMARY

An electromagnetic wave detection apparatus according to a first aspect comprises: a first image formation unit configured to form an image of incident electromagnetic waves; a travel unit including a plurality of pixels arranged along a reference surface, and configured to cause electromagnetic waves incident on the reference surface from the first image formation unit to travel in a first direction for each of the plurality of pixels; a second image formation unit configured to form an image of electromagnetic waves traveling in the first direction; and a first detector configured to detect electromagnetic waves incident from the second image formation unit, wherein the electromagnetic wave detection apparatus has at least one of: an arrangement in which respective extension surfaces of the reference surface and a detection surface of the first detector intersect each other and a main axis of the second image formation unit passes through the reference surface and the detection surface of the first detector; and an arrangement in which respective extension surfaces of the reference surface and an object surface of the first image formation unit whose spacing to the travel unit is set and whose image surface is the reference surface intersect each other and a main axis of the first image formation unit passes through the reference surface.

An electromagnetic wave detection apparatus according to a second aspect comprises: a first image formation unit configured to form an image of incident electromagnetic waves; a travel unit including a plurality of pixels arranged along a reference surface, and configured to cause electromagnetic waves incident on the reference surface from the first image formation unit to travel in a first direction for each of the plurality of pixels; a second image formation unit configured to form an image of electromagnetic waves traveling in the first direction; and a first detector configured to detect electromagnetic waves incident from the second image formation unit, wherein the electromagnetic wave detection apparatus has at least one of: an arrangement in which an image in a main axis neighborhood by the second image formation unit for an image on the reference surface by the first image formation unit is contained within a detection surface of the first detector; and an arrangement in which an image in a main axis neighborhood by the first image formation unit for an object through which a main axis of the first image formation unit passes is contained within the reference surface.

An information acquisition system according to a third aspect comprises: an electromagnetic wave detection apparatus including: a first image formation unit configured to form an image of incident electromagnetic waves; a travel unit including a plurality of pixels arranged along a reference surface, and configured to cause electromagnetic waves incident on the reference surface from the first image formation unit to travel in a first direction for each of the plurality of pixels; a second image formation unit configured to form an image of electromagnetic waves traveling in the first direction; and a first detector configured to detect electromagnetic waves incident from the second image formation unit, wherein the electromagnetic wave detection apparatus has at least one of: an arrangement in which respective extension surfaces of the reference surface and a detection surface of the first detector intersect each other and a main axis of the second image formation unit passes through the reference surface and the detection surface of the first detector; and an arrangement in which respective extension surfaces of the reference surface and an object surface of the first image formation unit whose spacing to the travel unit is set and whose image surface is the reference surface intersect each other and a main axis of the first image formation unit passes through the reference surface; and a control apparatus configured to acquire information about surroundings of the electromagnetic wave detection apparatus based on the electromagnetic waves detected by the first detector.

An information acquisition system according to a fourth aspect comprises: an electromagnetic wave detection apparatus including: a first image formation unit configured to form an image of incident electromagnetic waves; a travel unit including a plurality of pixels arranged along a reference surface, and configured to cause electromagnetic waves incident on the reference surface from the first image formation unit to travel in a first direction for each of the plurality of pixels; a second image formation unit configured to form an image of electromagnetic waves traveling in the first direction; a first detector configured to detect electromagnetic waves incident from the second image formation unit; a third image formation unit configured to form an image of electromagnetic waves traveling in the second direction; and a second detector configured to detect electromagnetic waves incident from the third image formation unit, wherein the electromagnetic wave detection apparatus has at least one of: an arrangement in which respective extension surfaces of the reference surface and a detection surface of the first detector intersect each other and a main axis of the second image formation unit passes through the reference surface and the detection surface of the first detector; and an arrangement in which respective extension surfaces of the reference surface and an object surface of the first image formation unit whose spacing to the travel unit is set and whose image surface is the reference surface intersect each other and a main axis of the first image formation unit passes through the reference surface; and a control apparatus configured to acquire information about surroundings of the electromagnetic wave detection apparatus based on the electromagnetic waves detected by the second detector.

An information acquisition system according to a fifth aspect comprises: an electromagnetic wave detection apparatus including: a first image formation unit configured to form an image of incident electromagnetic waves; a travel unit including a plurality of pixels arranged along a reference surface, and configured to cause electromagnetic waves incident on the reference surface from the first image formation unit to travel in a first direction for each of the plurality of pixels; a second image formation unit configured to form an image of electromagnetic waves traveling in the first direction; a first detector configured to detect electromagnetic waves incident from the second image formation unit; and a third detector configured to detect electromagnetic waves traveling in the third direction, wherein the electromagnetic wave detection apparatus has at least one of: an arrangement in which respective extension surfaces of the reference surface and a detection surface of the first detector intersect each other and a main axis of the second image formation unit passes through the reference surface and the detection surface of the first detector; and an arrangement in which respective extension surfaces of the reference surface and an object surface of the first image formation unit whose spacing to the travel unit is set and whose image surface is the reference surface intersect each other and a main axis of the first image formation unit passes through the reference surface; and a control apparatus configured to acquire information about surroundings of the electromagnetic wave detection apparatus based on the electromagnetic waves detected by the third detector.

DETAILED DESCRIPTION

Figure 1:
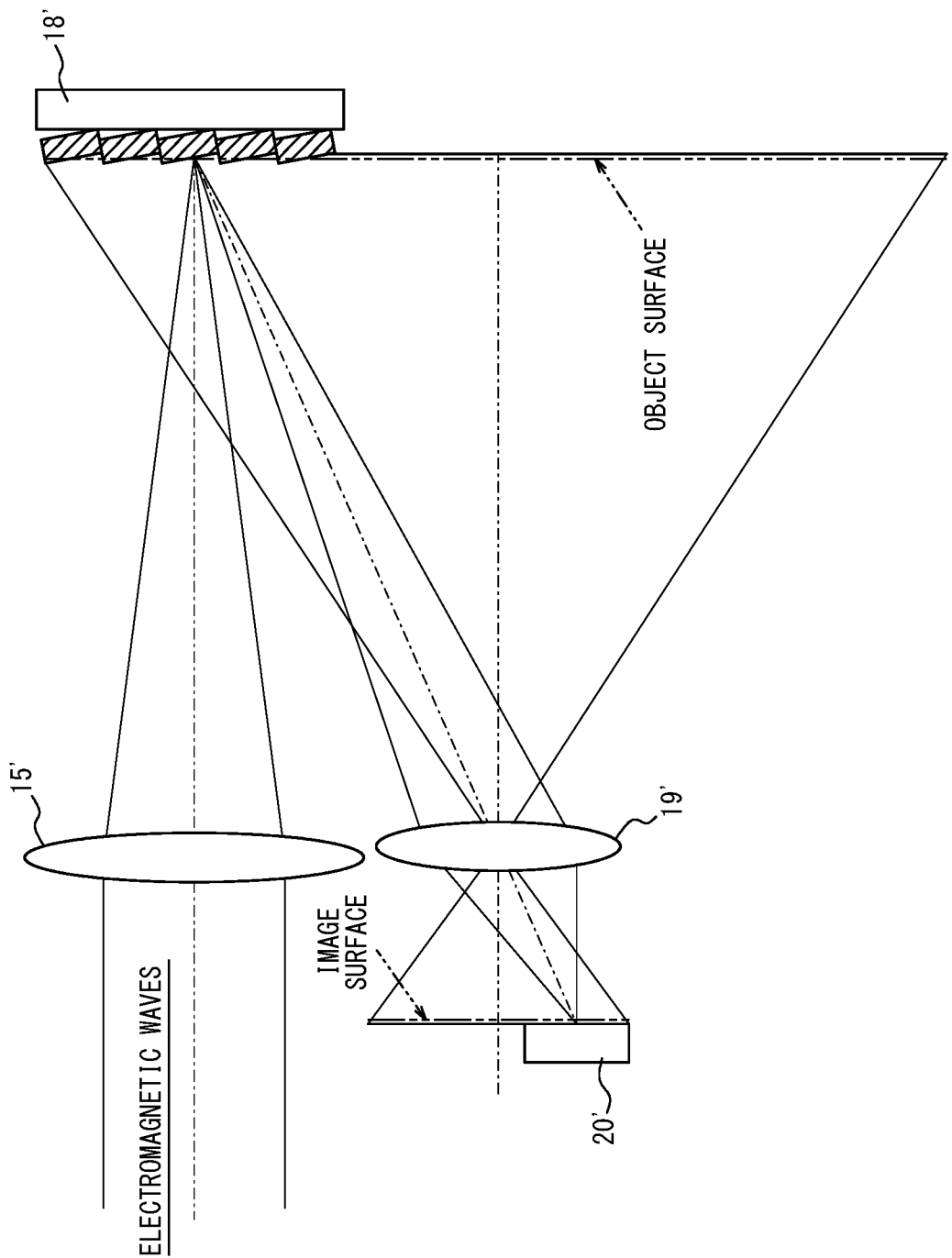
FIG. 1 is a diagram illustrating, in an electromagnetic wave detection apparatus in which a main surface of a primary image formation optical system, a reference surface of a travel unit, a main surface of a secondary image formation optical system, and a detection surface of a detector are parallel to each other, an angle-of-view range of the secondary image formation optical system for an image formed on the detection surface.

Embodiments of an electromagnetic wave detection apparatus to which the present disclosure is applied will be described below, with reference to the drawings. As illustrated in FIG. 1, in a structure in which a main surface of a primary image formation optical system 15' that causes electromagnetic waves to form an image on a reference surface of a travel unit 18', the reference surface of the travel unit 18', a main surface of a secondary image formation optical system 19', and a detection surface of a detector 20' are parallel to each other, an angle-of-view range away from the main axis in the angle-of-view range of the secondary image formation optical system 19' is used for detection in some cases. Typically, in an angle-of-view range away from the main axis of an image formation system, the resolution is lower than in an angle-of-view range near the main axis (i.e. main axis neighborhood). The electromagnetic wave detection apparatus to which the present disclosure is applied is configured to use, for detection, an image of electromagnetic waves in a main axis neighborhood of the secondary image formation optical system 19'. This can improve the resolution of the image of electromagnetic waves. Hereafter, the "main axis neighborhood" refers to, on an image formation surface of an image formation optical system, a region of a predetermined range centering at the main axis of the image formation optical system. The predetermined range can be set depending on the required resolution.

Figure 2:
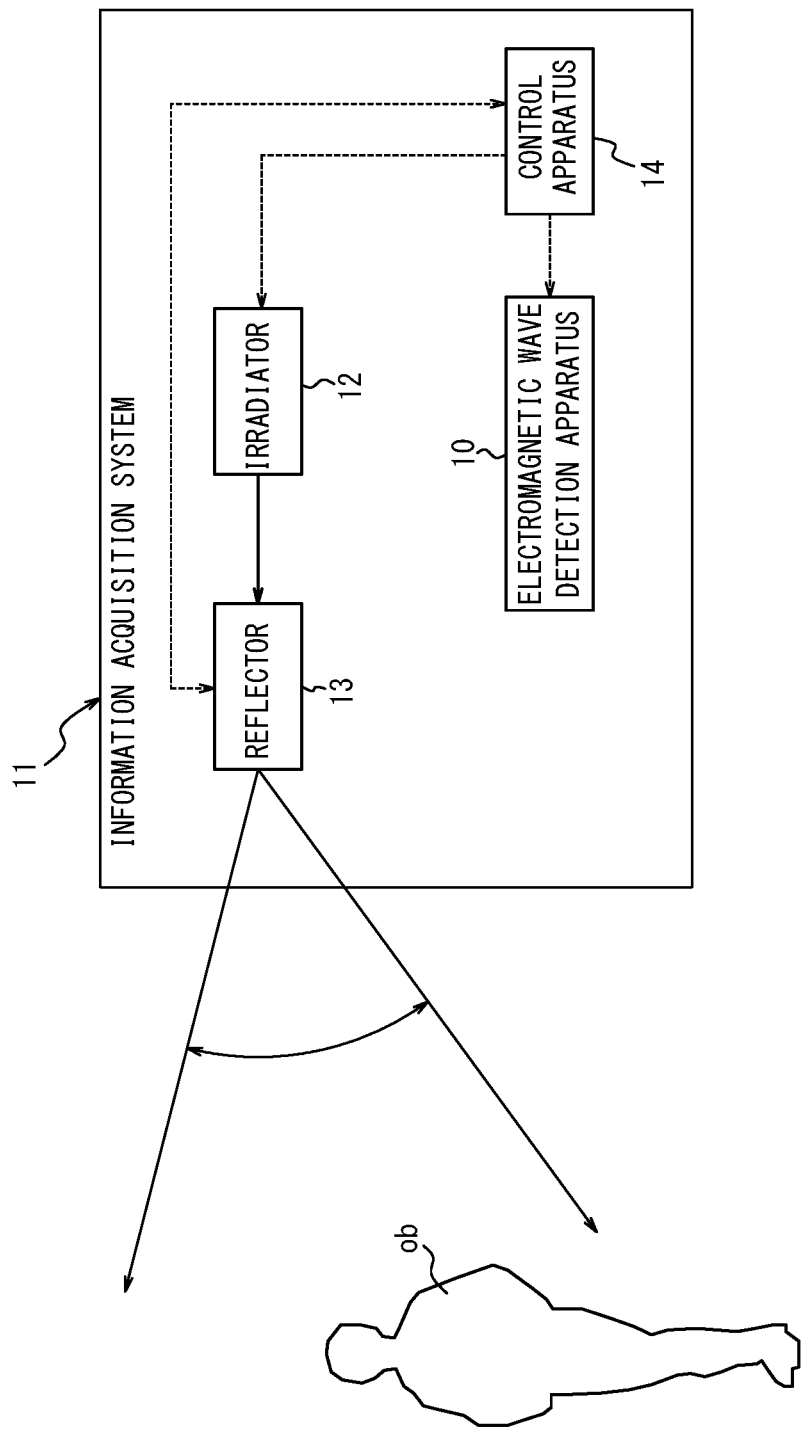
FIG. 2 is a diagram illustrating a schematic structure of an information acquisition system including an electromagnetic wave detection apparatus according to a first embodiment.

An information acquisition system 11 including an electromagnetic wave detection apparatus 10 according to a first embodiment of the present disclosure includes the electromagnetic wave detection apparatus 10, an irradiator 12, a reflector 13, and a control apparatus 14, as illustrated in FIG. 2.

In the drawings, dashed lines connecting functional blocks indicate the flow of control signals or the communication of information. Communications indicated by dashed lines may be wire communications or wireless communications. Solid lines extending from functional blocks indicate electromagnetic waves in beam form.

Figure 3:
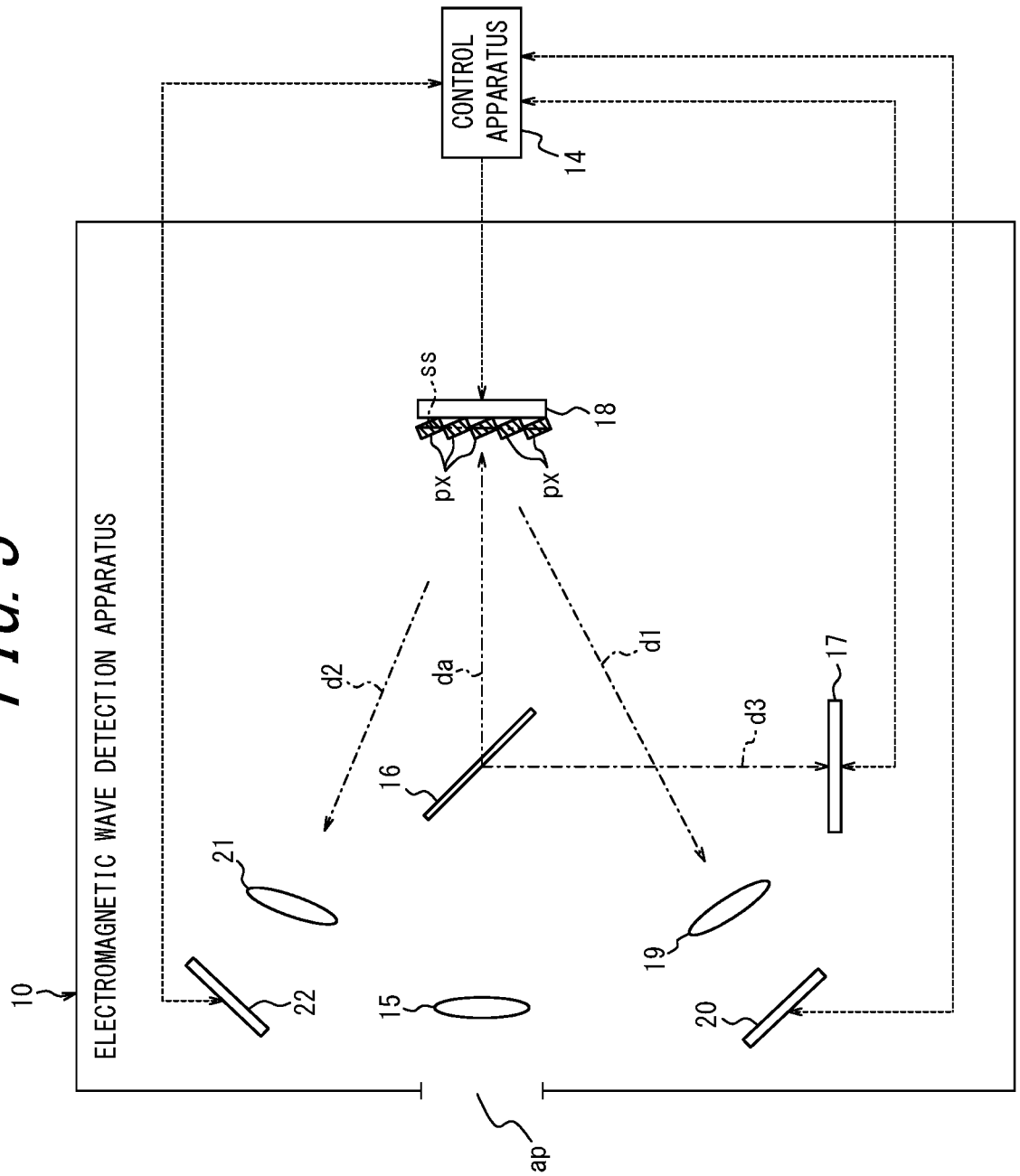
FIG. 3 is a diagram illustrating a schematic structure of the electromagnetic wave detection apparatus in FIG. 2.

The electromagnetic wave detection apparatus 10 includes a first image formation unit 15, a separator 16, a travel unit 18, a second image formation unit 19, a first detector 20, a third image formation unit 21, a second detector 22, and a third detector 17, as illustrated in FIG. 3.

The first image formation unit 15 is located at a position facing an aperture ap formed in a housing of the electromagnetic wave detection apparatus 10 so that its main axis is parallel to the axis of the aperture ap. In the case where the aperture ap is defined by a tube such as a body tube, the axis of the aperture ap is the axis of the tube. In the case where the aperture ap is formed directly in the housing, the axis of the aperture ap is a line perpendicular to the wall surface of the housing around the aperture ap and passing through the center of the aperture ap.

The first image formation unit 15 includes, for example, at least one of a lens and a mirror. The first image formation unit 15 forms an image of electromagnetic waves incident from an object "ob" as a subject. The first image formation unit 15 may be a lens system of retrofocus type.

The separator 16 is located between the first image formation unit 15 and a primary image formation position that is the position of the image of the object "ob" formed by the first image formation unit 15. The separator 16 separates electromagnetic waves incident from the first image formation unit 15 so as to travel in a travel unit direction da toward the travel unit 18 and a third direction d3 toward the third detector 17. The separator 16 may separate the incident electromagnetic waves so that electromagnetic waves of a first frequency travel in the travel unit direction da and electromagnetic waves of a second frequency travel in the third direction d3.

The separator 16 separates the incident electromagnetic waves to travel in the third direction d3 and the travel unit direction da, by at least one of reflection, separation, and refraction. In the first embodiment, for example, the separator 16 reflects a part of the incident electromagnetic waves in the third direction d3, and transmits another part of the electromagnetic waves in the travel unit direction da. For example, the separator 16 may transmit a part of the incident electromagnetic waves in the third direction d3, and reflect another part of the electromagnetic waves in the travel unit direction da. For example, the separator 16 may refract a part of the incident electromagnetic waves in the third direction d3, and transmit another part of the electromagnetic waves in the travel unit direction da. For example, the separator 16 may transmit a part of the incident electromagnetic waves in the third direction d3, and refract another part of the electromagnetic waves in the travel unit direction da. For example, the separator 16 may refract a part of the incident electromagnetic waves in the third direction d3, and refract another part of the electromagnetic waves in the travel unit direction da.

The separator 16 may include, for example, at least one of a half mirror, a beam splitter, a dichroic mirror, a cold mirror, a hot mirror, a meta-surface, a deflection element, and a prism.

The travel unit 18 is provided in the path of electromagnetic waves traveling in the travel unit direction da from the separator 16. Moreover, the travel unit 18 is located at or near the primary image formation position of the object "ob" by the first image formation unit 15 in the travel unit direction da.

In the first embodiment, the travel unit 18 is provided at the primary image formation position. The travel unit 18 has a reference surface "ss" on which electromagnetic waves that have passed through the first image formation unit 15 and the separator 16 are incident. The reference surface "ss" is composed of a plurality of pixels "px" arranged in two dimensions. The reference surface "ss" is a surface for imposing an action such as reflection or transmission on the electromagnetic waves in at least one of the below-described first state and the second state. The reference surface "ss" may be perpendicular to the central axis of electromagnetic waves traveling in the travel unit direction da from the separator 16.

The travel unit 18 is capable of switching each pixel "px" between the first state in which electromagnetic waves incident on the reference surface "ss" are caused to travel in a first direction d1 and the second state in which the incident electromagnetic waves are caused to travel in a second direction d2. In the first embodiment, the first state is a first reflection state in which electromagnetic waves incident on the reference surface "ss" are reflected in the first direction d1, and the second state is a second reflection state in which electromagnetic waves incident on the reference surface "ss" are reflected in the second direction d2.

More specifically, in the first embodiment, the travel unit 18 includes, for each pixel "px", a reflective surface for reflecting electromagnetic waves. By changing the orientation of the reflective surface of each pixel "px", the travel unit 18 can switch the pixel "px" between the first reflection state and the second reflection state.

In the first embodiment, for example, the travel unit 18 includes a digital micromirror device (DMD). The DMD can drive each of the micro reflective surfaces of the pixels "px" constituting the reference surface "ss", to switch the reflective surface between a state of being inclined at +12° with respect to the reference surface "ss" and a state of being inclined at −12° with respect to the reference surface "ss". The reference surface "ss" is parallel to a plate surface of a substrate on which the micro reflective surfaces are placed in the DMD.

The travel unit 18 switches each pixel "px" between the first state and the second state, based on control by the below-described control apparatus 14. For example, the travel unit 18 can simultaneously switch some pixels "px" to the first state to cause electromagnetic waves incident on the pixels "px" to travel in the first direction d1, and switch the other pixels "px" to the second state to cause electromagnetic waves incident on the pixels "px" to travel in the second direction d2.

The second image formation unit 19 is located in the first direction d1 from the travel unit 18. The second image formation unit 19 includes, for example, at least one of a lens and a mirror. The second image formation unit 19 is located so that its main surface is inclined with respect to the reference surface "ss" of the travel unit 18. The second image formation unit 19 may be located so that its main axis passes through the reference surface "ss" of the travel unit 18. The second image formation unit 19 may be located so that its main axis passes through the center of the reference surface "ss", i.e. the centered pixel "px". The second image formation unit 19 forms an image of the object "ob" as electromagnetic waves for which the traveling direction has been changed by the travel unit 18.

The first detector 20 is located in the path of electromagnetic waves traveling in the first direction d1 from the travel unit 18 and passing through the second image formation unit 19. The first detector 20 is located at or near a secondary image formation position by the second image formation unit 19 for an image of electromagnetic waves formed on the reference surface "ss" of the travel unit 18. The first detector 20 is located so that its detection surface is inclined with respect to the reference surface "ss", i.e. so that the respective extension surfaces of the detection surface and the reference surface "ss" intersect each other. The first detector 20 may be located so as to be inclined with respect to the main surface of the second image formation unit 19. The first detector 20 is located so that the main axis of the second image formation unit 19 passes through the detection surface of the first detector 20. The first detector 20 may be located so that the main axis of the second image formation unit 19 passes through the center of the detection surface of the first detector 20.

The first detector 20 may be located so that the extension surface of the detection surface intersects the respective extension surfaces of the reference surface "ss" and the main surface of the second image formation unit 19 on a single straight line. Thus, the reference surface "ss", the main surface of the second image formation unit 19, and the detection surface of the first detector 20 may be arranged so as to satisfy the condition of the Scheimpflug principle. The first detector 20 detects electromagnetic waves that have passed through the second image formation unit 19, i.e. electromagnetic waves traveling in the first direction d1.

In the first embodiment, the first detector 20 is a passive sensor. More specifically, in the first embodiment, the first detector 20 includes an element array. For example, the first detector 20 includes an imaging element such as an image sensor or an imaging array, and captures an image formed by electromagnetic waves on the detection surface and generates image information corresponding to the imaged object "ob".

More specifically, in the first embodiment, the first detector 20 captures an image of visible light. The first detector 20 transmits the generated image information to the control apparatus 14 as a signal.

The first detector 20 may capture an image other than visible light, such as an infrared, ultraviolet, or radio wave image. The first detector 20 may include a ranging sensor. With this structure, the electromagnetic wave detection apparatus 10 can acquire distance information in image form from the first detector 20. The first detector 20 may include a thermosensor or the like. With this structure, the electromagnetic wave detection apparatus 10 can acquire temperature information in image form from the first detector 20.

The third image formation unit 21 is located in the second direction d2 from the travel unit 18. The third image formation unit 21 includes, for example, at least one of a lens and a mirror. The third image formation unit 21 is located so that its main surface is inclined with respect to the reference surface "ss" of the travel unit 18. The third image formation unit 21 may be located so that its main axis passes through the reference surface "ss" of the travel unit 18. The third image formation unit 21 may be located so that its main axis passes through the center of the reference surface "ss", i.e. the centered pixel "px". The third image formation unit 21 forms an image of the object "ob" as electromagnetic waves for which the traveling direction has been changed by the travel unit 18.

The second detector 22 is located in the path of electromagnetic waves traveling in the second direction d2 from the travel unit 18 and passing through the third image formation unit 21. The second detector 22 is located at or near a secondary image formation position by the third image formation unit 21 for an image of electromagnetic waves formed on the reference surface "ss" of the travel unit 18. The second detector 22 is located so that its detection surface is inclined with respect to the reference surface "ss", i.e. so that the respective extension surfaces of the detection surface and the reference surface "ss" intersect each other. The second detector 22 is located so as to be inclined with respect to the main surface of the third image formation unit 21. The second detector 22 may be located so that the main axis of the third image formation unit 21 passes through the detection surface of the second detector 22. The second detector 22 may be located so that the main axis of the third image formation unit 21 passes through the center of the detection surface of the second detector 22.

The second detector 22 may be located so that the extension surface of the detection surface intersects the respective extension surfaces of the reference surface "ss" and the main surface of the third image formation unit 21 on a single straight line. Thus, the reference surface "ss", the main surface of the third image formation unit 21, and the detection surface of the second detector 22 may be arranged so as to satisfy the condition of the Scheimpflug principle. The second detector 22 detects electromagnetic waves that have passed through the third image formation unit 21, i.e. electromagnetic waves traveling in the second direction d2.

In the first embodiment, the second detector 22 is an active sensor that detects reflected waves as a result of the object "ob" reflecting electromagnetic waves emitted from the irradiator 12 to the object "ob". In the first embodiment, the second detector 22 detects reflected waves as a result of the object "ob" reflecting electromagnetic waves emitted from the irradiator 12 and reflected by the reflector 13 to the object "ob". Electromagnetic waves emitted from the irradiator 12 are at least one of infrared, visible light, ultraviolet, and radio waves. The second detector 22 is a sensor of the same type as or a different type from the first detector 20, and detects electromagnetic waves of the same type as or a different type from that detected by the first detector 20, as described later.

More specifically, in the first embodiment, the second detector 22 includes an element forming a ranging sensor. For example, the second detector 22 includes a single element such as an avalanche photodiode (APD), a photodiode (PD), a single photon avalanche diode (SPAD), a millimeter wave sensor, a sub-millimeter wave sensor, or a ranging image sensor. The second detector 22 may include an element array such as an APD array, a PD array, a multi photon pixel counter (MPPC), a ranging imaging array, or a ranging image sensor.

In the first embodiment, the second detector 22 transmits, as a signal, detection information indicating that reflected waves from the subject have been detected, to the control apparatus 14. More specifically, the second detector 22 is an infrared sensor that detects electromagnetic waves in the infrared band.

For the second detector 22, it is sufficient that the foregoing structure including a single element forming a ranging sensor is able to detect electromagnetic waves, and it is not necessary to form an image on its detection surface. Hence, the second detector 22 need not be necessarily located at or near the secondary image formation position which is the image formation position of the third image formation unit 21. With this structure, the second detector 22 may be located anywhere in the path of electromagnetic waves traveling in the travel unit direction da from the travel unit 18 and passing through the third image formation unit 21, as long as electromagnetic waves from all angles of view can be incident on its detection surface.

The third detector 17 is provided in the path of electromagnetic waves traveling in the third direction d3 from the separator 16. Moreover, the third detector 17 is located at or near the image formation position of the object "ob" by the first image formation unit 15 in the third direction d3 from the separator 16. The third detector 17 detects electromagnetic waves traveling in the third direction d3 from the separator 16.

In the first embodiment, the third detector 17 is a passive sensor. More specifically, in the first embodiment, the third detector 17 includes an element array. For example, the third detector 17 includes an imaging element such as an image sensor or an imaging array, and captures an image formed by electromagnetic waves on the detection surface and generates image information corresponding to the imaged object "ob".

More specifically, in the first embodiment, the third detector 17 captures an image of visible light. The third detector 17 transmits the generated image information to the control apparatus 14 as a signal.

The third detector 17 may capture an image other than visible light, such as an infrared, ultraviolet, or radio wave image. The third detector 17 may include a ranging sensor. With this structure, the electromagnetic wave detection apparatus 10 can acquire distance information in image form from the third detector 17. The third detector 17 may include a ranging sensor, a thermosensor, or the like. With this structure, the electromagnetic wave detection apparatus 10 can acquire temperature information in image form from the third detector 17.

The irradiator 12 radiates at least one of infrared, visible light, ultraviolet, and radio waves. In the first embodiment, the irradiator 12 radiates infrared. The irradiator 12 irradiates the object "ob" with the radiated electromagnetic waves either directly or indirectly through the reflector 13. In the first embodiment, the irradiator 12 irradiates the object "ob" with the radiated electromagnetic waves indirectly through the reflector 13.

In the first embodiment, the irradiator 12 radiates electromagnetic waves of narrow width, e.g. 0.5°, in beam form. In the first embodiment, the irradiator 12 can radiate electromagnetic waves in pulse form. For example, the irradiator 12 includes a light emitting diode (LED), a laser diode (LD), and the like. The irradiator 12 switches between radiating electromagnetic waves and stopping the radiation, based on control by the below-described control apparatus 14.

The reflector 13 reflects the electromagnetic waves radiated from the irradiator 12 while changing the direction, to change the irradiation position at which the object "ob" is irradiated with the electromagnetic waves. That is, the reflector 13 scans the object "ob" by the electromagnetic waves radiated from the irradiator 12. Thus, in the first embodiment, the second detector 22 forms a scanning ranging sensor together with the reflector 13. The reflector 13 scans the object "ob" one-dimensionally or two-dimensionally. In the first embodiment, the reflector 13 scans the object "ob" two-dimensionally.

The reflector 13 is configured so that at least part of the irradiation region of the electromagnetic waves radiated from the irradiator 12 and reflected by the reflector 13 is included in the electromagnetic wave detection range of the electromagnetic wave detection apparatus 10. Hence, at least part of the electromagnetic waves with which the object "ob" is irradiated through the reflector 13 is detectable by the electromagnetic wave detection apparatus 10.

In the first embodiment, the reflector 13 is configured so that at least part of the irradiation region of the electromagnetic waves radiated from the irradiator 12 and reflected by the reflector 13 is included in the detection range in the second detector 22. Hence, in the first embodiment, at least part of the electromagnetic waves with which the object "ob" is irradiated through the reflector 13 is detectable by the second detector 22.

The reflector 13 includes, for example, a microelectromechanical systems (MEMS) mirror, a polygon mirror, a galvanometer mirror, or the like. In the first embodiment, the reflector 13 includes a MEMS mirror.

The reflector 13 changes the direction in which the electromagnetic waves are reflected, based on control by the below-described control apparatus 14. For example, the reflector 13 may include an angle sensor such as an encoder, and may notify the control apparatus 14 of the angle detected by the angle sensor as direction information indicating the direction in which the electromagnetic waves are reflected. With this structure, the control apparatus 14 can calculate the irradiation position based on the direction information acquired from the reflector 13. The control apparatus 14 can also calculate the irradiation position based on a drive signal that is input in order to cause the reflector 13 to change the direction in which the electromagnetic waves are reflected.

The control apparatus 14 includes one or more processors and memory. The processors may include at least one of a general-purpose processor that performs a specific function by reading a specific program and a dedicated processor dedicated to a specific process. The dedicated processor may include an application specific integrated circuit (ASIC). Each processor may include a programmable logic device (PLD). The PLD may include a field-programmable gate array (FPGA). The control apparatus 14 may include at least one of a system on a chip (SoC) and a system in a package (SiP) in which one or more processors cooperate with each other.

The control apparatus 14 acquires information about the surroundings of the electromagnetic wave detection apparatus 10, based on the electromagnetic waves detected by each of the first detector 20, the second detector 22, and the third detector 17. Examples of the information about the surroundings include image information, distance information, and temperature information. In the first embodiment, the control apparatus 14 acquires, as image information, the electromagnetic waves detected by the first detector 20 or the third detector 17 as an image, as described above. In the first embodiment, the control apparatus 14 acquires distance information of the irradiation position by the irradiator 12 based on the detection information of the second detector 22 using a time-of-flight (ToF) method, as described later.

Figure 4:
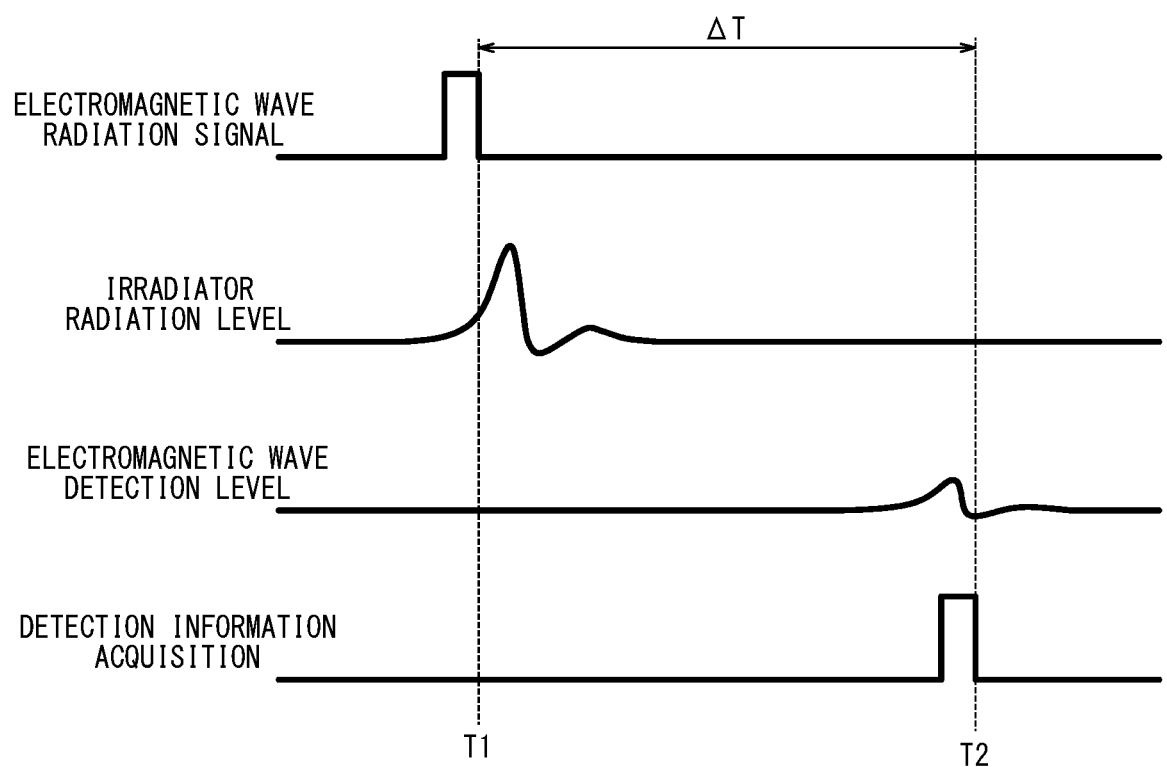
FIG. 4 is a timing chart illustrating timing of electromagnetic wave radiation and timing of electromagnetic wave detection, for explaining the principle of ranging by a ranging sensor composed of an irradiator, a second detector, and a controller.

As illustrated in FIG. 4, the control apparatus 14 inputs an electromagnetic wave radiation signal to the irradiator 12 to cause the irradiator 12 to radiate electromagnetic waves in pulse form (see "electromagnetic wave radiation signal"). The irradiator 12 emits electromagnetic waves based on the input electromagnetic wave radiation signal (see "irradiator radiation level"). Electromagnetic waves radiated by the irradiator 12 and reflected by the reflector 13 to be applied to a given irradiation region are reflected in the irradiation region. The control apparatus 14 switches at least some of the pixels "px" in the image formation region on the travel unit 18 formed by the first image formation unit 15 from the reflected waves in the irradiation region to the first state, and the other pixels "px" to the second state. The first detector 20, upon detecting the electromagnetic waves reflected in the irradiation region (see "electromagnetic wave detection level"), provides the detection information to the control apparatus 14, as described above.

The control apparatus 14 includes, for example, a time measurement LSI (large scale integrated circuit), and measures a time period $\Delta T$ from time T1 at which the irradiator 12 radiates the electromagnetic waves to time T2 at which the detection information is acquired (see "detection information acquisition"). The control apparatus 14 multiplies the time period $\Delta T$ by the speed of light and divides the result by 2, to calculate the distance to the irradiation position. Here, the control apparatus 14 calculates the irradiation position based on the direction information acquired from the reflector 13 or the drive signal output from the control apparatus 14 to the reflector 13, as described above. The control apparatus 14, while changing the irradiation position, calculates the distance to each irradiation position, thus generating distance information in image form.

In the first embodiment, the information acquisition system 11 has a structure in which distance information is generated by direct ToF whereby electromagnetic waves are emitted and the time until the electromagnetic waves return is directly measured, as described above. However, the information acquisition system 11 is not limited to such a structure. For example, the information acquisition system 11 may generate distance information by flash ToF whereby electromagnetic waves are emitted at regular intervals and the time to the return is indirectly measured from the phase difference between the emitted electromagnetic waves and the returned electromagnetic waves. The information acquisition system 11 may generate distance information by other ToF methods, such as phased ToF.

Figure 5:
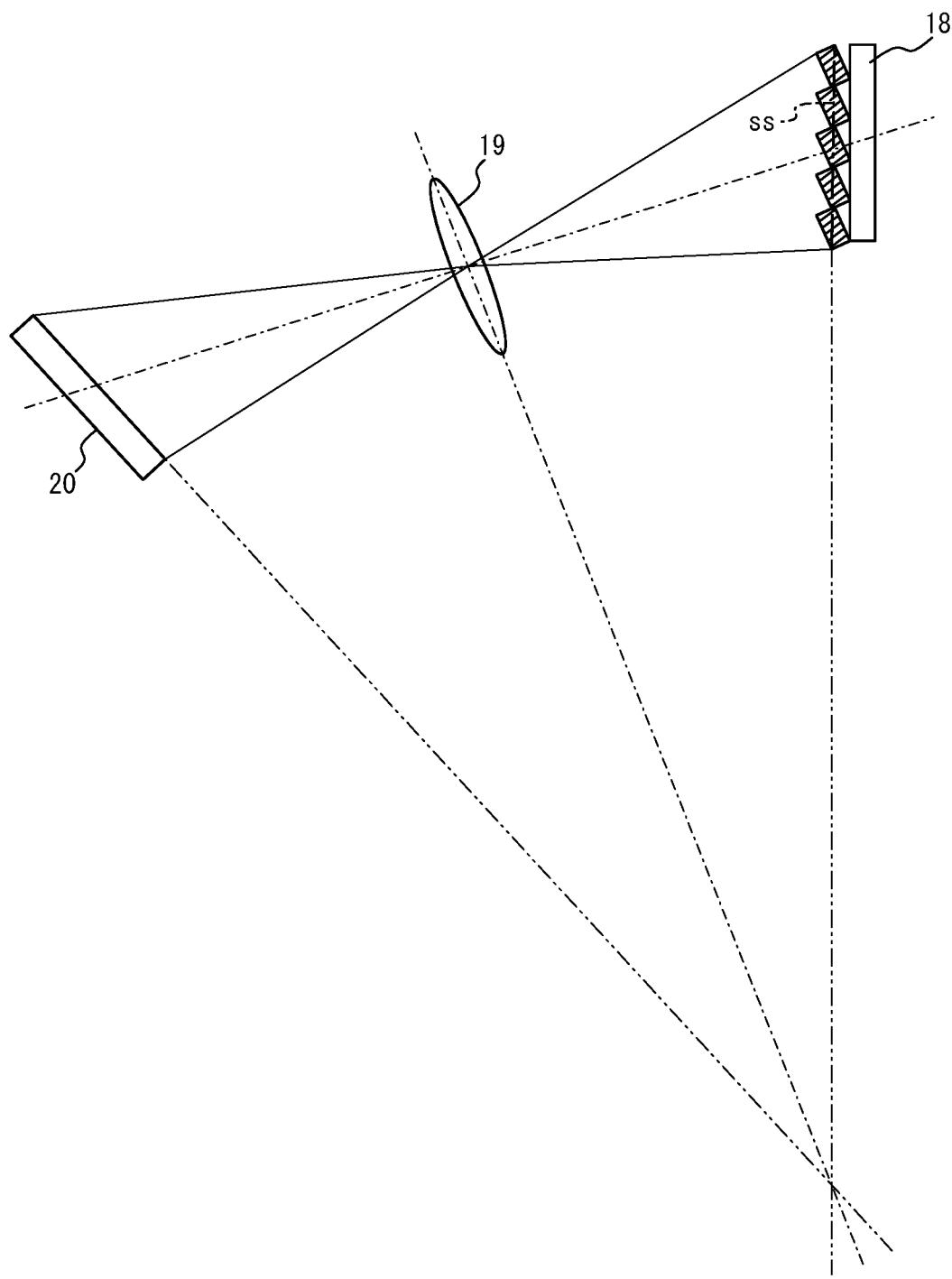
FIG. 5 is a diagram illustrating an angle-of-view range of a second image formation unit for an image formed on a first detection surface in the electromagnetic wave detection apparatus in FIG. 2.

In the electromagnetic wave detection apparatus 10 according to the first embodiment with the structure described above, the travel unit 18, the second image formation unit 19, and the first detector 20 are arranged so that the respective extension surfaces of the reference surface "ss" and the detection surface of the first detector 20 intersect each other and the main axis of the second image formation unit 19 passes through the reference surface "ss" and the detection surface of the first detector 20. With such a structure, the reference surface "ss" of the travel unit 18, the main surface of the second image formation unit 19, and the detection surface of the first detector 20 can be arranged so as to satisfy the condition of the Scheimpflug principle, as illustrated in FIG. 5. Accordingly, in the electromagnetic wave detection apparatus 10, even though the second image formation unit 19 is displaced from a position facing the travel unit 18, an image of electromagnetic waves can be formed on the detection surface of the first detector 20 so that the image formed in a main axis neighborhood of the second image formation unit 19 for an image formed on the reference surface "ss" by the first image formation unit 19 be contained within the detection surface of the first detector 20. The electromagnetic wave detection apparatus 10 can thus improve the resolution of the image of electromagnetic waves detected by the first detector 20. Such structures and effects also apply to the below-described electromagnetic wave detection apparatus according to a second embodiment.

The electromagnetic wave detection apparatus 10 according to the first embodiment is capable of switching electromagnetic waves between the first state and the second state for each pixel "px". With such a structure, the electromagnetic wave detection apparatus 10 can align the main axis of the first image formation unit 15 to the main axis of the second image formation unit 19 in the first direction d1 in which the electromagnetic waves travel in the first state and to the main axis of the third image formation unit 21 in the second direction d2 in which the electromagnetic waves travel in the second state. Accordingly, the electromagnetic wave detection apparatus 10 can reduce deviation between the main axes of the first detector 20 and the second detector 22, by switching each pixel "px" in the travel unit 18 to the first state or the second state. The electromagnetic wave detection apparatus 10 can thus reduce deviation between the coordinate systems in the detection results by the first detector 20 and the second detector 22. Such structures and effects also apply to the below-described electromagnetic wave detection apparatus according to a second embodiment.

The electromagnetic wave detection apparatus 10 according to the first embodiment includes the third image formation unit 21 and the second detector 22. With such a structure, the electromagnetic wave detection apparatus 10 can detect information based on electromagnetic waves for each part of the object "ob" emitting electromagnetic waves incident on each pixel "px", by the second detector 22. Such structures and effects also apply to the below-described electromagnetic wave detection apparatus according to the second embodiment.

In the electromagnetic wave detection apparatus 10 according to the first embodiment, the travel unit 18, the third image formation unit 21, and the second detector 22 are arranged so that the respective extension surfaces of the reference surface "ss", the main surface of the third image formation unit 21, and the detection surface of the second detector 22 intersect one another on the same straight line. With such a structure, the reference surface "ss" of the travel unit 18, the main surface of the third image formation unit 21, and the detection surface of the second detector 22 can be arranged so as to satisfy the condition of the Scheimpflug principle. Accordingly, in the electromagnetic wave detection apparatus 10, even though the third image formation unit 21 is displaced from a position facing the travel unit 18, an image of electromagnetic waves in a main axis neighborhood of the third image formation unit 21 can be detected on the detection surface of the second detector 22. The electromagnetic wave detection apparatus 10 can thus improve the resolution of the image of electromagnetic waves detected by the second detector 22.

The electromagnetic wave detection apparatus 10 according to the first embodiment separates electromagnetic waves incident from the first image formation unit 15 to travel in the travel unit direction da and the third direction d3. With such a structure, the electromagnetic wave detection apparatus 10 can align the main axis of the first image formation unit 15 to the central axis of electromagnetic waves traveling in the travel unit direction da and the central axis of electromagnetic waves traveling in the third direction d3. Accordingly, the electromagnetic wave detection apparatus 10 can reduce deviation in coordinate system between each of the first detector 20 and the second detector 22 and the third detector 17. Such structures and effects also apply to the below-described electromagnetic wave detection apparatus according to the second embodiment.

The electromagnetic wave detection apparatus 10 according to the first embodiment includes the third detector 17. With such a structure, the electromagnetic wave detection apparatus 10 can additionally detect electromagnetic waves of the same image as the image formed on the first detector 20. Such structures and effects also apply to the below-described electromagnetic wave detection apparatus according to the second embodiment.

In the information acquisition system 11 according to the first embodiment, the control apparatus 14 acquires information about the surroundings of the electromagnetic wave detection apparatus 10, based on the electromagnetic waves detected by each of the first detector 20, the second detector 22, and the third detector 17. With such a structure, the information acquisition system 11 can provide useful information based on the detected electromagnetic waves.

An electromagnetic wave detection apparatus according to the second embodiment of the present disclosure will be described below. The second embodiment is different from the first embodiment in respect to the postures of the travel unit and the third detector relative to the first image formation unit and the positions and postures of the third image formation unit and the second detector relative to the travel unit. The second embodiment will be described below, mainly focusing on the differences from the first embodiment. Parts having the same structures as those in the first embodiment are given the same reference signs.

Figure 6:
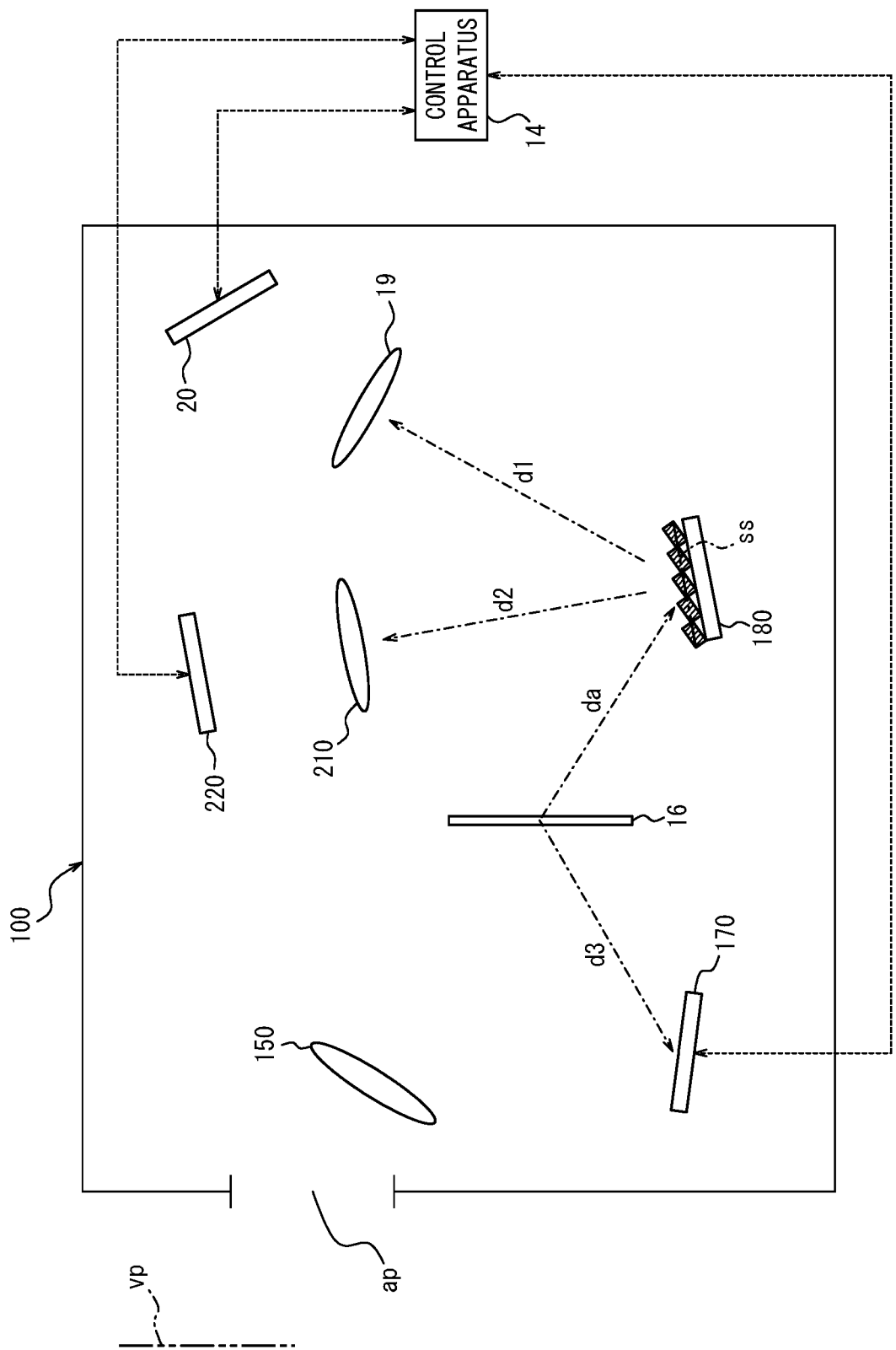
FIG. 6 is a diagram illustrating a schematic structure of an electromagnetic wave detection apparatus according to a second embodiment.

As illustrated in FIG. 6, an electromagnetic wave detection apparatus 100 according to the second embodiment includes a first image formation unit 150, a separator 16, a travel unit 180, a second image formation unit 19, a first detector 20, a third image formation unit 210, a second detector 220, and a third detector 170. Components other than the electromagnetic wave detection apparatus 100 in the information acquisition system 11 according to the second embodiment are the same as those in the first embodiment. The separator 16, the second image formation unit 19, and the first detector 20 in the second embodiment have the same structures and functions as those in the first embodiment.

In the second embodiment, the first image formation unit 150 is located so that its main axis is inclined with respect to the axis of the aperture ap and passes through the aperture ap, unlike in the first embodiment. The structure and function of the first image formation unit 150 are the same as those of the first image formation unit 150 in the first embodiment.

In the second embodiment, the travel unit 180 is located so that the reference surface "ss" is inclined with respect to a virtual plane vp through which the main axis of the first image formation unit 150 passes, i.e. so that the respective extension surfaces of the virtual plane vp and the reference surface "ss" intersect each other, unlike in the first embodiment. The virtual plane vp may be a plane that is at a predetermined distance away from the first image formation unit 150 and is perpendicular to the axis of the aperture ap. The predetermined distance is the distance to the object surface from the first image formation unit 150 whose spacing to the travel unit 180 is set and whose image surface is the reference surface "ss".

The travel unit 180 may be located so that the respective extension surfaces of the main surface of the first image formation unit 150 and the reference surface "ss" of the travel unit 180 intersect each other, i.e. so that the reference surface "ss" is inclined with respect to the main surface of the first image formation unit 150. In the second embodiment, in the case where the separation to the travel unit direction da by the separator 16 is refraction, the inclination arrangement of the reference surface "ss" with respect to the main surface of the first image formation unit 150 means inclination arrangement, with respect to the main surface of the first image formation unit 150, of the reference surface "ss" of the travel unit 180 rotated in the opposite direction of the refraction by (angle of incidence—angle of refraction) about the position of the separator 16. In the second embodiment, in the case where the separation to the travel unit direction da by the separator 16 is reflection, the inclination arrangement of the reference surface "ss" with respect to the main surface of the first image formation unit 150 means inclination arrangement, with respect to the main surface of the first image formation unit 150, of the reference surface "ss" in a plane-symmetrical posture on the reflective surface of the separator 16.

The travel unit 180 is located so that the main axis of the first image formation unit 150 passes through the reference surface "ss" of the travel unit 180. The travel unit 180 may be located so that the main axis of the first image formation unit 150 passes through the center of the reference surface "ss" of the travel unit 180.

The travel unit 180 may be located so that the extension surface of the reference surface "ss" intersects the main surface of the first image formation unit 150 and virtual plane vp on a single straight line. Thus, the main surface of the first image formation unit 150, the reference surface "ss", and the virtual plane vp are arranged so as to satisfy the condition of the Scheimpflug principle.

In the second embodiment, the travel unit 180 may be located so that a second direction d2 as a direction of travel by the travel unit 180 is perpendicular to the reference surface "ss". The structure and function of the travel unit 180 other than the posture described above are the same as those of the travel unit 18 in the first embodiment.

In the second embodiment, the second image formation unit 19 is located in a first direction d1 as a direction of travel by the travel unit 180 so that its main surface is inclined with respect to the reference surface "ss" of the travel unit 180, as in the first embodiment. The other arrangement condition, structure, and function of the second image formation unit 19 in the second embodiment are the same as those of the second image formation unit 19 in the first embodiment.

In the second embodiment, the first detector 20 is located at or near a secondary image formation position by the second image formation unit 19 for an image of electromagnetic waves formed on the reference surface "ss" of the travel unit 18, as in the first embodiment. In the second embodiment, the first detector 20 is located so that the extension surface of the detection surface intersects the respective extension surfaces of the reference surface "ss" and the main surface of the second image formation unit 19 on a single straight line, as in the first embodiment. Thus, in the second embodiment, too, the reference surface "ss", the main surface of the second image formation unit 19, and the detection surface of the first detector 20 are arranged so as to satisfy the condition of the Scheimpflug principle, as in the first embodiment. The other arrangement condition, structure, and function of the first detector 20 in the second embodiment are the same as those of the first detector 20 in the first embodiment.

In the second embodiment, the third image formation unit 210 is located so that its main surface is parallel to the reference surface "ss" of the travel unit 18, unlike in the first embodiment. The other arrangement condition, structure, and function of the third image formation unit 210 in the second embodiment are the same as those of the third image formation unit 21 in the first embodiment.

In the second embodiment, the second detector 220 is located so that its detection surface is perpendicular to the main axis of the third image formation unit 210, unlike in the first embodiment. The other arrangement condition, structure, and function of the second detector 220 in the second embodiment are the same as those of the second detector 22 in the first embodiment.

In the second embodiment, the third detector 170 is located so that the respective extension surfaces of the main surface of the first image formation unit 150 and the detection surface of the third detector 170 intersect each other, i.e. so that the detection surface is inclined with respect to the main surface of the first image formation unit 150, unlike in the first embodiment. In the second embodiment, in the case where the separation to the third direction d3 by the separator 16 is refraction, the inclination arrangement of the detection surface with respect to the main surface of the first image formation unit 150 means inclination arrangement, with respect to the main surface of the first image formation unit 150, of the detection surface of the third detector 170 rotated in the opposite direction of the refraction by (angle of incidence—angle of refraction) about the position of the separator 16. In the second embodiment, in the case where the separation to the third direction d3 by the separator 16 is reflection, the inclination arrangement of the detection surface with respect to the main surface of the first image formation unit 150 means inclination arrangement, with respect to the main surface of the first image formation unit 150, of the detection surface in a plane-symmetrical posture on the reflective surface of the separator 16.

The third detector 170 and the first image formation unit 150 are arranged so that the respective extension surfaces of the main surface of the first image formation unit 150 and the detection surface of the third detector 170 intersect each other on the virtual plane vp. Thus, the main surface of the first image formation unit 150, the detection surface of the third detector 170, and the virtual plane vp are arranged so as to satisfy the condition of the Scheimpflug principle. The other arrangement condition, structure, and function of the third detector 170 in the second embodiment are the same as those of the third detector 17 in the first embodiment.

As described above, in the electromagnetic wave detection apparatus 100 according to the second embodiment, the first image formation unit 150 and the travel unit 180 are arranged so that the respective extension surfaces of the virtual plane vp through which the main axis of the first image formation unit 150 passes and the reference surface "ss" of the travel unit 180 intersect each other and the main axis of the first image formation unit 150 passes through the reference surface "ss". With such a structure, the virtual plane vp at the predetermined distance away from the first image formation unit 150, the main surface of the first image formation unit 150, and the reference surface "ss" of the travel unit 180, and the main surface of the second image formation unit 19 and the detection surface of the first detector 20 are arranged so as to satisfy the condition of the Scheimpflug principle. Thus, in the electromagnetic wave detection apparatus 10, even with the structure in which the first image formation unit 150 is not located at a position facing the travel unit 180, an image of electromagnetic waves can be formed on the reference surface "ss" of the travel unit 180 so that the image formed in a main axis neighborhood by the first image formation unit 150 for the object on the virtual plane through which the main axis of the first image formation unit 150 passes can be contained within the reference surface "ss" of the travel unit 180. Therefore, in the electromagnetic wave detection apparatus 10, the third image formation unit 210 can be located at a position facing the travel unit 180. Consequently, while the reference surface "ss" of the travel unit 180 and the main surface of the third image formation unit 210 are parallel to each other, the third image formation unit 210 can be located so that the main axis of the third image formation unit 210 passes through the reference surface "ss" of the travel unit 180. With such arrangement, the electromagnetic wave detection apparatus 10 can form an image of an angle-of-view range in a main axis neighborhood of the third image formation unit 210 on the second detector 220, so that the resolution of the image of electromagnetic waves detected by the second detector 220 can be improved.

While some embodiments of the present disclosure have been described above with reference to the drawings, various changes or modifications may be easily made by those of ordinary skill in the art based on the present disclosure. Such various changes or modifications are therefore included in the scope of the present disclosure.

For example, although the irradiator 12, the reflector 13, and the control apparatus 14 constitute the information acquisition system 11 together with the electromagnetic wave detection apparatus 10 or 100 in each of the first and second embodiments, the electromagnetic wave detection apparatus 10 or 100 may include at least one of the irradiator 12, the reflector 13, and the control apparatus 14. For example, the electromagnetic wave detection apparatus 10 or 100 may include the control apparatus 14 as a controller.

Although the travel unit 18 or 180 can switch the traveling direction of electromagnetic waves incident on the reference surface "ss" between two directions, i.e. the first direction d1 and the second direction d2, in each of the first and second embodiments, the traveling direction may be switched not between two directions but among three or more directions.

Although the first state and the second state in the travel unit 18 or 180 in each of the first and second embodiments are respectively the first reflection state in which electromagnetic waves incident on the reference surface "ss" are reflected in the first direction d1 and the second reflection state in which the electromagnetic waves are reflected in the second direction d2, the travel unit 18 or 180 is not limited to such.

For example, the first state may be a passing state in which electromagnetic waves incident on the reference surface "ss" are allowed to pass to travel in the first direction d1. More specifically, the travel unit 18 or 180 may include a shutter having a reflective surface for reflecting electromagnetic waves in the second direction d2, for each pixel "px". The travel unit 18 or 180 having such a structure can switch each pixel "px" between the passing state or the transmission state as the first state and the reflection state as the second state, by opening or closing the shutter of the pixel "px". An example of the travel unit 18 or 180 having such a structure is a MEMS shutter in which a plurality of shutters that are openable and closable are arranged in an array on a plane.

The travel unit 18 or 180 may include a liquid crystal shutter capable of switching between a reflection state in which electromagnetic waves are reflected and a transmission state in which electromagnetic waves are transmitted depending on the liquid crystal orientation. The travel unit 18 or 180 having such a structure can switch each pixel "px" between the transmission state as the first state and the reflection state as the second state, by switching the liquid crystal orientation of the pixel "px".

Although the information acquisition system 11 in each of the first and second embodiments has a structure in which the second detector 22 or 220 functions as a scanning active sensor together with the reflector 13 that scans the object with electromagnetic waves in beam form radiated from the irradiator 12, the information acquisition system 11 is not limited to such a structure. For example, even in the case where the information acquisition system 11 does not include the reflector 13 and radiates radial electromagnetic waves from the irradiator 12 and acquires information without scanning, effects similar to those of the first embodiment can be achieved.

Although the information acquisition system 11 in each of the first and second embodiments has a structure in which the first detector 20 and the third detector 17 or 170 are passive sensors and the second detector 20 or 220 is an active sensor, the information acquisition system 11 is not limited to such a structure. For example, even in the case where the first detector 20, the second detector 22 or 220, and the third detector 17 or 170 are all active sensors or all passive sensors or any one of the first detector 20, the second detector 22 or 220, and the third detector 17 or 170 is a passive sensor in the information acquisition system 11, effects similar to those of the first and second embodiments can be achieved.

It should be noted that the system is disclosed herein as having various modules and/or units for executing specific functions. These modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Input/output (I/O) devices or user interfaces including, but not limited to, a keyboard, a display, a touchscreen, and a pointing device may be connected to the system directly or via intervening I/O controllers. Thus, the disclosed various aspects may be embodied in many different forms, and all such embodiments are within the scope of the present disclosure.

REFERENCE SIGNS LIST 10, 100 electromagnetic wave detection apparatus
11 information acquisition system
12 irradiator
13 reflector
14 control apparatus
15 first image formation unit
15' primary image formation optical system
16 separator
17 third detector
18, 180 travel unit
18' travel unit
19 second image formation unit
19' secondary image formation optical system
20 first detector
20' detector
21 third image formation unit
22 second detector
ap aperture
da travel unit direction
d1, d2, d3 first direction, second direction, third direction
ob object
px pixel
ss reference surface
vp virtual plane

The invention claimed is:

1. An electromagnetic wave detection apparatus comprising:
an irradiator configured to emit electromagnetic waves;
a reflector configured to eject the electromagnetic waves radiated from the irradiator to an object while changing an irradiation position;
a first image formation unit configured to form an image of reflected waves as a result of the object reflecting and incident on the electromagnetic waves;
a travel unit including a plurality of pixels arranged along a reference surface, and configured to cause electromagnetic waves incident on the reference surface from the first image formation unit to travel in a first direction for each of the plurality of pixels;
a second image formation unit configured to form an image of electromagnetic waves traveling in the first direction; and
a first detector configured to detect electromagnetic waves incident from the second image formation unit,
wherein the electromagnetic wave detection apparatus has an arrangement in which the reference surface, a detection surface of the first detector, and the second image formation unit satisfy a condition of Scheimpflug principle.

2. The electromagnetic wave detection apparatus according to claim 1, having at least one of: an arrangement in which the main axis of the second image formation unit passes through a center of the reference surface and a center of the detection surface of the first detector; and an arrangement in which the main axis of the first image formation unit passes through the center of the reference surface.

3. The electromagnetic wave detection apparatus according to claim 1, further comprising
a separator configured to separate electromagnetic waves incident from the first image formation unit, to travel in a direction toward the travel unit and a third direction.

4. The electromagnetic wave detection apparatus according to claim 3, wherein the separator is configured to separate the electromagnetic waves incident from the first image formation unit so that electromagnetic waves of a first frequency travel in the direction toward the travel unit and electromagnetic waves of a second frequency travel in the third direction.

5. The electromagnetic wave detection apparatus according to claim 3, further comprising
an irradiator configured to irradiate an object with the electromagnetic waves,
wherein the separator configured to cause the electromagnetic waves of the same frequency as reflected waves as a result of the object reflecting electromagnetic waves emitted from the irradiator among the electromagnetic waves incident from the first formation unit to travel toward the travel unit, and the travel unit configured to cause the reflected waves among the incident electromagnetic waves to travel in the second direction.

6. The electromagnetic wave detection apparatus according to claim 1, further comprising:
a control apparatus configured to cause the reflected waves to travel in the first direction by switching at least some of pixels in an image formation region on the travel unit formed by the first image formation unit from the reflected waves to a first state and the reflected waves in a second direction by switching the other pixels to a second state, the second direction being different from the first direction.

7. The electromagnetic wave detection apparatus according to claim 6, further comprising:
a separator configured to cause a part of electromagnetic waves incident from the first image formation unit to travel toward the travel unit and another part of the electromagnetic waves to travel toward a third detector, the third detector comprising an imaging element.

8. The electromagnetic wave detection apparatus according to claim 7, wherein the first detector comprising a ranging sensor.

9. The electromagnetic wave detection apparatus according to claim 6, further comprising:
a third image formation unit configured to form an image of electromagnetic waves traveling in the second direction; and
a second detector configured to detect electromagnetic waves incident from the third image formation unit.

10. The electromagnetic wave detection apparatus according to claim 9, having an arrangement in which the reference surface a detection surface of the second detector, and the third image formation unit satisfy a condition of the Scheimpflug principle.

11. The electromagnetic wave detection apparatus according to claim 9, having an arrangement in which a main axis of the third image formation unit passes through a center of the reference surface and a center of a detection surface of the second detector.

12. The electromagnetic wave detection apparatus according to claim 1, wherein the first detector comprising an imaging element.

* * * * *